United States Patent
Buck et al.

(10) Patent No.: US 9,620,146 B2
(45) Date of Patent: Apr. 11, 2017

(54) SPEECH COMMUNICATION SYSTEM FOR COMBINED VOICE RECOGNITION, HANDS-FREE TELEPHONY AND IN-CAR COMMUNICATION

(75) Inventors: Markus Buck, Biberach (DE); Tim Haulick, Blaubeuren (DE); Timo Matheja, Ulm (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days.

(21) Appl. No.: 14/398,769

(22) PCT Filed: May 16, 2012

(86) PCT No.: PCT/US2012/038070
§ 371 (c)(1),
(2), (4) Date: Nov. 13, 2014

(87) PCT Pub. No.: WO2013/172827
PCT Pub. Date: Nov. 21, 2013

(65) Prior Publication Data
US 2015/0120305 A1    Apr. 30, 2015

(51) Int. Cl.
*G10L 15/00* (2013.01)
*G10L 25/48* (2013.01)
(Continued)

(52) U.S. Cl.
CPC ............ *G10L 25/48* (2013.01); *H04M 3/568* (2013.01); *H04R 3/005* (2013.01); *H04R 3/12* (2013.01);
(Continued)

(58) Field of Classification Search
CPC .......... G10L 15/22; G10L 15/265; H04R 1/40
(Continued)

(56) References Cited

U.S. PATENT DOCUMENTS

| 6,192,339 B1* | 2/2001 | Cox | G10L 15/30 704/270 |
| 6,230,138 B1* | 5/2001 | Everhart | G10L 15/26 454/74 |

(Continued)

FOREIGN PATENT DOCUMENTS

| EP | 1 301 015 A2 | 4/2003 |
| EP | 1 748 636 A1 | 1/2007 |
| WO | WO 2008/061205 A2 | 5/2008 |

OTHER PUBLICATIONS

Notification of Transmittal of the International Search Report and the Written Opinion of the International Searching Authority, or the Declaration, PCT/US2012/038070, date of mailing Apr. 17, 2013, 5 pages.
(Continued)

*Primary Examiner* — Daniel Abebe
(74) *Attorney, Agent, or Firm* — Daly, Crowley, Mofford & Durkee, LLP (57) ABSTRACT

A multi-mode speech communication system is described that has different operating modes for different speech applications. A speech service compartment contains multiple system users, multiple input microphones that develop microphone input signals from the system users to the system, and multiple output loudspeakers that develop loudspeaker output signals from the system to the system users. A signal processing module is in communication with the speech applications and includes an input processing module and an output processing module. The input processing module processes the microphone input signals to produce a set user input signals for each speech application that are limited to currently active system users for that speech application. The output processing module processes application output communications from the speech applications to produce loudspeaker output signals to the system users, (Continued)

wherein for each different speech application, the loudspeaker output signals are directed only to system users currently active in that speech application. The signal processing module dynamically controls the processing of the microphone input signals and the loudspeaker output signals to respond to changes in currently active system users for each application.

21 Claims, 4 Drawing Sheets

(51) Int. Cl.
*H04M 3/56* (2006.01)
*H04R 3/00* (2006.01)
*H04R 3/12* (2006.01)
*H04R 27/00* (2006.01)
*H04M 1/60* (2006.01)

(52) U.S. Cl.
CPC .......... *G10L 15/00* (2013.01); *H04M 1/6075* (2013.01); *H04R 27/00* (2013.01); *H04R 2227/009* (2013.01); *H04R 2499/13* (2013.01)

(58) Field of Classification Search
USPC ....................................................... 704/275
See application file for complete search history.

(56) References Cited

U.S. PATENT DOCUMENTS

| | | | | |
|---|---|---|---|---|
| 7,016,836 B1* | 3/2006 | Yoda | ............... | G10L 15/20 455/563 |
| 7,047,192 B2* | 5/2006 | Poirier | ............... | G10L 15/26 704/235 |
| 7,904,300 B2* | 3/2011 | Abbott | ............... | G10L 15/30 704/270 |
| 8,595,008 B2* | 11/2013 | Cho | ............... | B60R 16/0373 704/231 |
| 2005/0049864 A1* | 3/2005 | Kaltenmeier | ........... | G10L 15/20 704/233 |
| 2005/0240404 A1* | 10/2005 | Gurram | ............... | G10L 15/32 704/231 |
| 2009/0055178 A1* | 2/2009 | Coon | ............... | B60R 16/0373 704/246 |
| 2011/0307250 A1* | 12/2011 | Sims | ............... | G10L 15/22 704/231 |
| 2012/0253823 A1* | 10/2012 | Schalk | ............. | G08G 1/096877 704/270.1 |
| 2013/0179163 A1* | 7/2013 | Herbig | ............... | H04R 3/005 704/233 |

OTHER PUBLICATIONS

Written Opinion of the International Searching Authority, PCT/US2012/038070, date of mailing Apr. 17, 2013, 8 pages.
Audino D. et al.,: "Wireless Audio Communication Network for In-Vehicle Access of Infotainment Services in Motorcycles", Personal, Indoor and Mobile Radio Communications, 2006 IEEE 17$^{th}$ International Symposium on, IEEE, PI, Sep. 11, 2006, Sep. 14, 2007, pp. 1-5, XP031023363, DOI: 10.1109/PIMRC.2006.254000. ISBN: 978-1-4244-0329-5. p. 1, right-hand column, line 15-line 28; p. 2, right-hand column, line 49; p. 3, left-hand column, line 35; figure 2; p. 5, left-hand column, line 10-line 48; figure 4.
PCT International Preliminary Report on Patentability for PCT/US2012/038070 dated Nov. 27, 2014, 5 pages.
Communication Pursuant to Rules 161(1) and 162 EPC dated Dec. 17, 2014 for European Application No. 12723791.5; 2 pages.
Response to Communication Pursuant to Rules 161(1) and 162 EPC dated Jun. 12, 2015 for European Application No. 12723791.5; 11 pages.

* cited by examiner

SPEECH COMMUNICATION SYSTEM FOR COMBINED VOICE RECOGNITION, HANDS-FREE TELEPHONY AND IN-CAR COMMUNICATION

CROSS REFERENCE TO RELATED APPLICATIONS

This application claims the benefit of PCT Application No. PCT/2012/038070 filed on May 16, 2012, entitled "Speech Communication System For Combined Voice Recognition, Hands-Free Telephony And In-Communication," which is incorporated herein by reference.

TECHNICAL FIELD

The invention relates to speech signal processing, particularly in an automobile.

BACKGROUND ART

Current systems for speech communication generally support different operating modes for different speech applications: one mode optimized for voice recognition (VR) and another one optimized for hands-free telephony (HF). Some recent speech communication systems also support in-car communication (ICC) where speech signals are reinforced within the car passenger compartment. However, even if there are multiple microphones and loudspeakers to support several persons, current state-of-the-art systems only operate in one mode at a time.

In vehicular multi-channel speech communication systems, multiple speakers can be supported, for example, by seat-dedicated microphones, microphone arrays and/or multiple loudspeakers within the vehicle. In HF telephone mode, several passengers in the vehicle may take part in a conference call where enhancement of the speech signals for the different speakers may improve the signal quality. And an adaptive mixer may only pass the audio signal of the currently active speaker through to the far-end listener. In VR mode, only one speaker (e.g., the driver) normally is supposed to operate the system by voice, whereas other persons are considered as interfering speakers. Here again, the speech signal can also be selectively extracted by multi-channel processing. The operating mode for ICC has to make sure that the persons in the car (or room) can understand among themselves. So, for instance, the speech of the driver or front passenger may be captured by some microphones located in the front of the vehicle and played back on rear loudspeakers for the back-seat passengers.

SUMMARY

Embodiments of the present invention are directed to a multi-mode speech communication system that has different operating modes for different speech applications. A speech service compartment contains multiple system users, multiple input microphones that develop microphone input signals from the system users to the system, and multiple output loudspeakers that develop loudspeaker output signals from the system to the system users. A signal processing module is in communication with the speech applications and includes an input processing module and an output processing module. The input processing module processes the microphone input signals to produce a set user input signals for each speech application that are limited to currently active system users for that speech application. The output processing module processes application output communications from the speech applications to produce loudspeaker output signals to the system users, wherein for each different speech application, the loudspeaker output signals are directed only to system users currently active in that speech application. The signal processing module dynamically controls the processing of the microphone input signals and the loudspeaker output signals to respond to changes in currently active system users for each application.

The speech applications may include one or more of a hands free telephone application, an in-car communication system, and an automatic speech recognition (ASR) application. The system may operate multiple different speech applications in parallel. Dynamically controlling the processing of the microphone input signals and the loudspeaker output signals is performed by a control module in response to control mechanism inputs from the system users. And the speech service compartment may be the passenger compartment of an automobile.

DETAILED DESCRIPTION

Embodiments of the present invention use multiple different operating modes for multiple different speech applications—for example, any of VR, HF, and ICC—at the same time using the same microphones and loudspeakers. State-of-the-art multi-microphone methods like beamforming, cross-talk compensation, or blind source separation allow the speech signals of simultaneously speaking persons to be selectively extracted. For example, in one specific such arrangement, for each application a corresponding enhanced input signal can be calculated where each enhanced input signal contains only the signals of the corresponding speakers and noise is removed and the signals of all the other speakers are canceled. A generic signal mixer can group specific sets of these enhanced input signals to generate application output signals that are further used for one or more of the different speech applications in one or more of the different operation modes. Several operating modes can be supported at the same time, and the number of users in the different modes can dynamically change. Such arrangements also are compatible with other speech enhancement schemes such as Acoustic Echo Cancellation and Noise Reduction. See e.g., R. Martin, *Combined Acoustic Echo Cancellation, Spectral Echo Shaping, and Noise Reduction*," in Proc. Int. Workshop on Acoustic Echo and Noise Control (IWAENC), Roros, Norway, June 1995, pp. 48-51; incorporated herein by reference.

Figure 1:
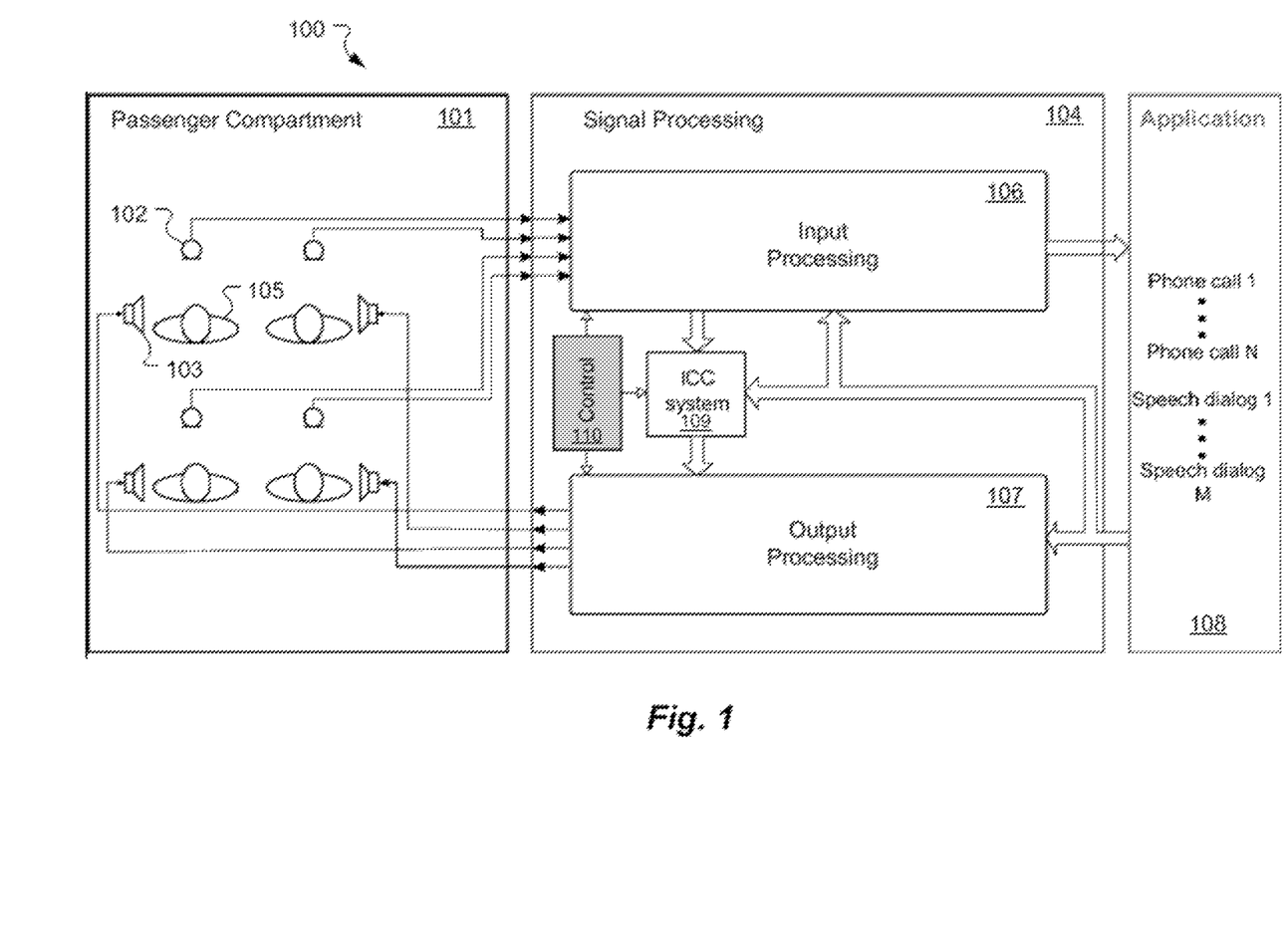
FIG. 1 shows a vehicle speech communication system according to an embodiment of the present invention.

FIG. 1 shows a vehicle speech communication system 100 which may include hardware and/or software which may run on one or more computer processor devices. A speech service compartment, such as a passenger compartment 101 in an automobile holds multiple passengers who are system users 105. The passenger compartment 101 also includes multiple input microphones 102 that develop microphone input signals from the system users 105 to the speech communication system 100. Multiple output loudspeakers 103 develop loudspeaker output signals from the speech communication system 100 to the system users 105.

A signal processing module 104 is in communication with multiple speech applications 108 and an in-car-communication (ICC) system 109, and includes an input processing module 106 and an output processing module 107. The input processing module 106 processes the microphone input signals to produce user input signals to the speech applications 108 and the ICC system 109 for each system user 105. The user input signals are enhanced to maximize speech from that system user 105 and to minimize other audio sources including speech from other system users 105. The output processing module 107 processes application output communications from the speech applications 108 and the ICC system 109 to produce loudspeaker output signals to output loudspeaker 103 for each system user 105 such that for each different speech processing application 108, the loudspeaker output signals are directed only to system users 105 currently active in that application.

A control module 110 (e.g., processor, microprocessor, microcontroller, etc.) in the signal processing module 104 dynamically controls the processing of the microphone input signals and the loudspeaker output signals to respond to changes in system users 105 currently active in each application. Audio data processed by the speech communication system 100 may be stored in a synchronous or asynchronous memory through one or more bi-directional and/or one or more uni-directional data buses. Such data storage memory may be a Read Only Memory (ROM), a Random Access Memory (RAM), or any other type of volatile and/or non-volatile storage space.

The signal processing module 104 may communicate through one or more input/output interfaces via wired or wireless connections using digital or analog audio data. The speech communication system 100 may use one or more processing and communication protocols, for example, 1850VPW, J1850PWM, ISO, ISO9141-2, ISO14230, CAN High Speed CAN, MOST, LIN, IDB-1394, IDB-C, D2B, Bluetooth, TTCAN, TTP, and/or FlexRay. The speech communication system 100 may communicate with external elements via a separate transmitter and/or receiver or a transceiver in half-duplex or full-duplex using coded and/or uncoded data representing audio data or control data. For example, the speech communication system 100 may use one or more wireless protocols, such as Bluetooth, 802.11b, 802.11j, 802.11x, Zigbee, Ultra Wide Band, Mobile FI, Wireless Local Area Network (WLAN), and/or Infrared Data Transmissions which may include the Infrared Data Association IrDa 1.0 standard which may provide high transfer rates, or the Infrared Data Association IrDa 1.1 standard which may provide higher transfer rates.

Figure 2:
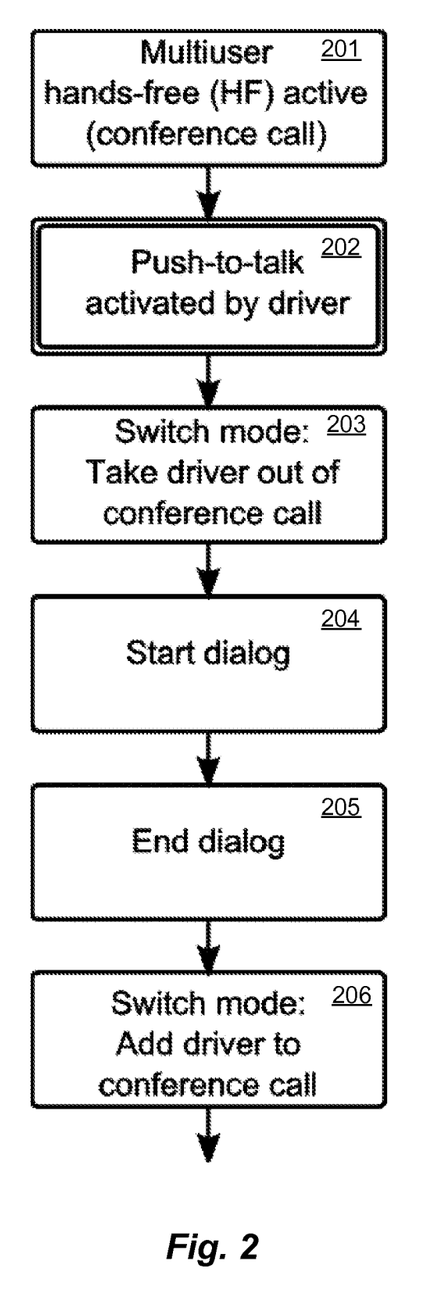
FIG. 2 shows various steps in operating a speech communication system according to an embodiment of the present invention.

FIG. 2 shows various steps in operating a speech communication system 100 according to an embodiment of the present invention that uses use multiple different operating modes for multiple system users 105 and multiple different speech applications 108 at the same time using multiple microphones 102 and multiple loudspeakers 103. In this example, there are four passengers in a car who are taking part in a hands-free telephone call. Initially, multi-user processing is active, step 201, all passengers are participants of the conference call and the ICC system is active for all seats. At this point, all input microphones 102 and all output loudspeakers 103 are available for all system users 105. Speech inputs from input microphones 102 are processed by the input processing module 106 of the signal processor 104, where the control module 110 directs them to either the current phone call in the speech applications block 108 or the ICC system block 110. The control module 110 also directs the operation of the output processing module 107 to direct audio signal outputs to the output loudspeakers 103 of the individual passenger system users 105.

During the call, the driver presses a push-to-talk button to start a speech dialog for entering a new destination address in the navigation system, step 202. The signal processing module 104 switches the operating mode for the driver to no longer process his/her voice for the conference call and the ICC system, step 203. Thus input processing module 106 enhances the microphone signal for the driver to remove all the other speaker voices and compartment noises and now the driver's voice is exclusively extracted for VR in a speech dialog to control the navigation system, step 204. During the driver's navigation control speech dialog, the system continues to process the conference call and ICC system for the other system users 105. The prompt output is optimized exclusively for the driver, whereas the signals received from HF and ICC are not played back for the driver's loudspeakers. And the output module 107 controls the output loudspeakers 103 to shape audio outputs to the driver that relate to the speech dialog for controlling the navigation system. After completing the speech dialog, step 205, the driver is placed back into the conference call and his speech is amplified again by the ICC system for the other passengers, step 206.

The foregoing describes a speech dialog for use of a vehicle navigation system to enter a destination address, but of course, speech dialogs are useful for operating other speech applications, too, such as message dictation, switching TV or radio channels, etc. And thus the foregoing ideas also extend to other specific situations such as where the internal ICC system initially may be the only active speech application when one of the passengers then starts a speech dialog with another different speech application.

Figure 3:
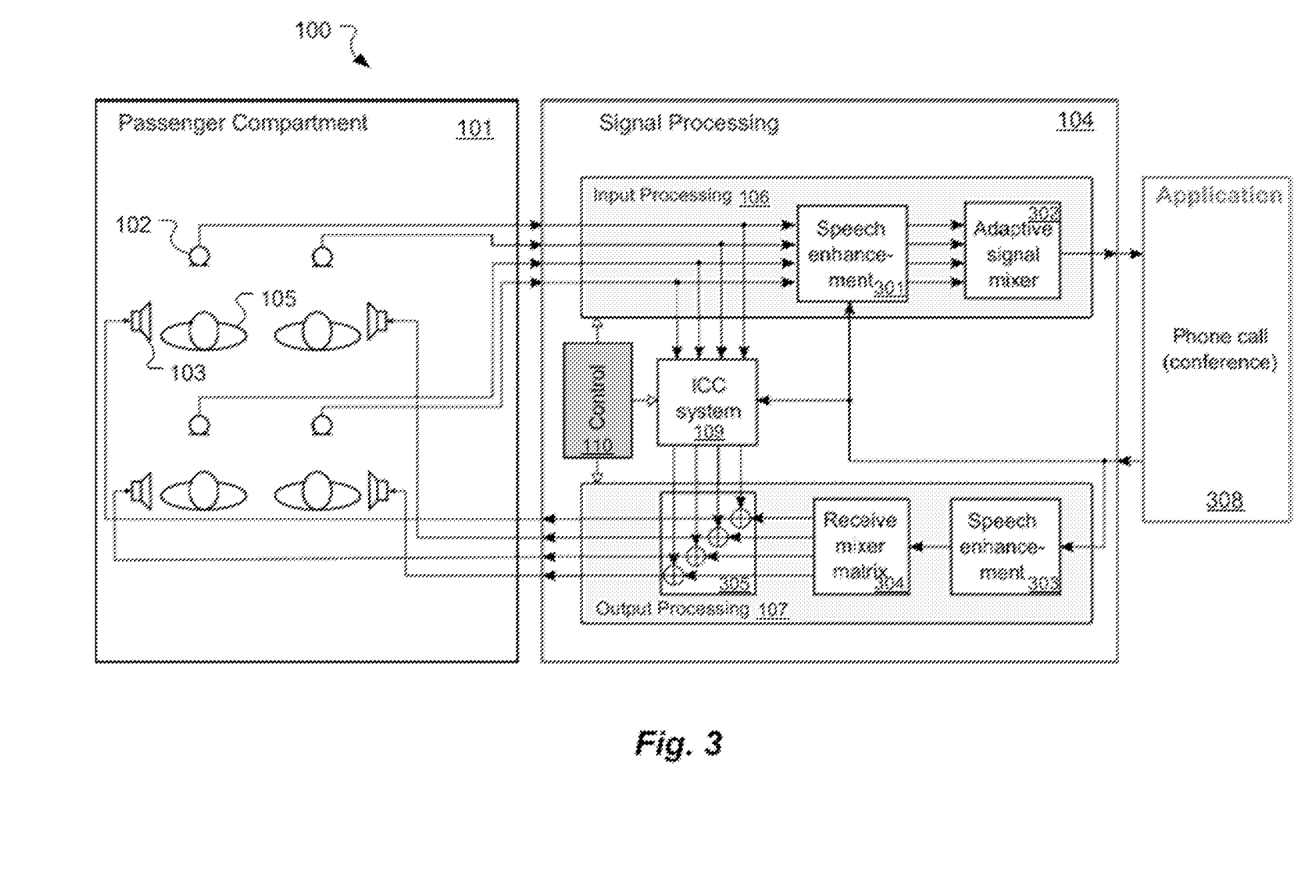
FIG. 3 shows the signal processing module in greater detail for the specific case where a conference call is the sole external speech application that currently active.

FIG. 3 shows the signal processing module 104 in greater detail for the specific case where a conference call 308 is the sole external speech application that currently active. In addition, the internal ICC system 109 also is available in parallel. Within the internal processing module 106, the signals from all the input microphones 102 are directly available to the ICC system 109 without significant signal enhancement, and also are provided to a speech enhancement module 301 for signal enhancement for the currently active external speech applications, in this case, the conference call 308. Depending of the specific external speech applications, the control module 110 may or may not direct the signal enhancement module 301 to perform noise reduction, acoustic echo cancellation, etc. In the specific case shown in FIG. 3, where the conference call 308 is the sole external speech application, there is no need for the signal enhancement module 301 to eliminate channel cross-talk components since the control module 110 indicates a single mixed output signal based on all the input microphones 102. Thus, in this case, no separation is needed for the signal components of the individual speaker users 105. For other specific speech applications, the specific signal processing by the speech enhancement module 301 will be applied as is most suitable. The enhanced signal outputs of the signal enhancement module 301 undergo adaptive mixing 302 reflecting different background noises, different speech signal levels, exploiting diversity effects and so on.

On the receive side if the signal processing module 104, there is similar signal enhancement of the outputs from the conference call 308 and the ICC system 110. For example, output side speech enhancement module 303 may provide specific output signal enhancement and optimization including without limitation bandwidth extension, noise reduction for the external speech applications, in this case, the conference call 308. The enhanced output of the output signal enhancement module 303 is adaptively mixed by a receiver mixer matrix 304 to produce multiple output signals for the various output loudspeakers 103 for each currently active speech application, in this case, the conference call 308. An ICC up-mix matrix 305 combines the speech application loudspeaker signals from the receiver mixer matrix 304 with speaker signals from the ICC system 109 to produce the individual loudspeaker signals to the individual output loudspeakers 103.

It is worth appreciating that the individual microphone and loudspeaker signals are mapped and controlled for each different speech application, which may be operating in parallel and/or sequentially. And at any one time, the number of microphone channels that are processed does not have to match the number of currently active speech applications or system users. And similarly, at any one time, the number of loudspeaker output channels that are processed and developed does not have to match the number of received signals from the different speech applications or for the total number of system users.

Figure 4:
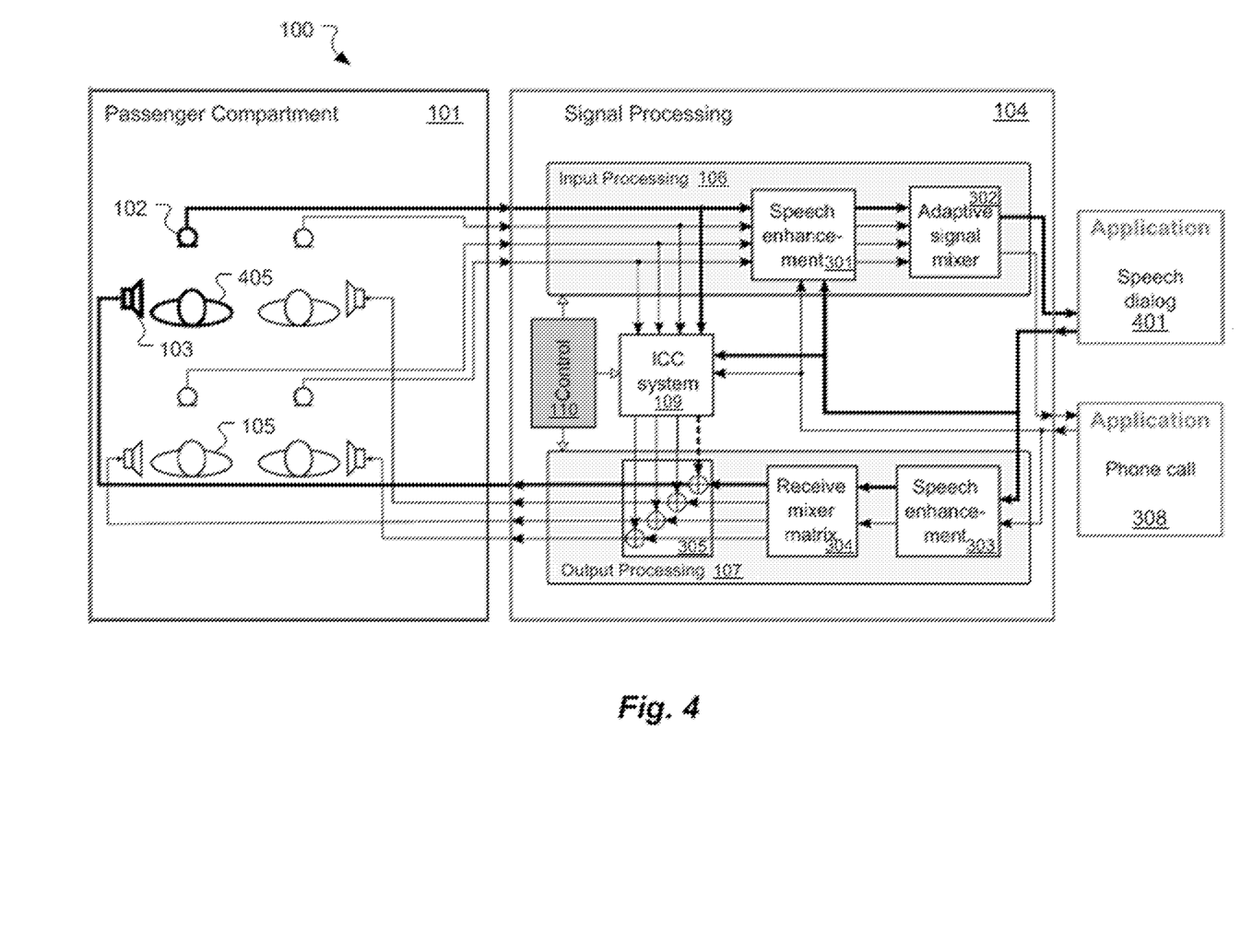
FIG. 4 shows how the generic vehicle speech communication system in FIG. 3 dynamically switches its operation when adding another external speech application.

The bold flow lines in FIG. 4 shows how the generic vehicle speech communication system 100 shown in FIG. 3 dynamically switches its operation when one of the system users 405 in the conference call 308 uses a push-to-talk button or other control mechanism to initiate a speech dialog 401 with another external speech application, such as for operating a navigational system to enter a destination address. The non-bold flow lines in FIG. 4 show that the operation of the generic vehicle speech communication system 100 continues as before for the other system users 105 in the conference call 308 and using the ICC system 110. But the up-mixed enhanced input signals from the adaptive signal mixer 302 to the conference call 308 are dynamically switched to omit speech from the input microphone 102 of the switching user 405. While the switching user microphone signal still is available for use in the ICC system 110 as shown by the vertical bold flow line on top right side of the block, the speech enhancement module 301 dynamically switches to enhance the microphone signal from the switching user 405 to optimize it for use in the external speech dialog 401. Similarly, the receive side speech enhancement module 303 now receives inputs from both currently active external speech applications, conference call 308 and speech dialog 401. And for each different such active external speech application, the receive side speech enhancement module 303 applies appropriate enhancement processing for that application. The loudspeaker output signals for the speech dialog 401 from the receiver mixer matrix 304 and ICC up-mix matrix 305 are directed to one or more output loudspeakers 103 for the speech dialog user 405, while the loudspeaker output signals for conference call 308 are directed to one or more output loudspeakers 103 for the conference call system users 105.

Thus, the operation of the generic vehicle speech communication system 100 dynamically switches to add and remove speakers from the different speech applications, which may be currently active in parallel with each other and/or sequentially. In this way, the specific signal processing can change dynamically during operation to optimize the signal processing for each different speech application.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A multi-mode speech communication system having a plurality of different operating modes, each operating mode associated with one of a plurality of different speech applications, the system comprising:
   a signal processing module in communication with the speech applications and including:
      an input processing module that processes microphone input signals received from a plurality of input microphones within a speech service compartment to produce a set of user input signals for each speech application that are limited to currently active system users for that speech application, and
      an output processing module that processes application output communications from the speech applications to produce loudspeaker output signals to system users, wherein for each different speech application, the loudspeaker output signals are directed only to output loudspeakers within the speech service compartment which are associated with system users currently active in that speech application;

wherein the signal processing module dynamically controls the processing of the microphone input signals and the loudspeaker output signals to respond to changes in currently active system users for each application, and wherein the signal processing module is capable of operating in a plurality of the different operating modes at a same time, and wherein the user input signals for each speech application are enhanced to maximize speech from system users of that speech application and to minimize audio sources other than those associated with that speech application, wherein the audio sources other than those associated with that speech application are substantially canceled such that the speech from system users of that speech application is substantially exclusively further processed by the input processing module.

2. A system according to claim 1, wherein the system operates a plurality of different speech applications in parallel.

3. A system according to claim 1, wherein the speech service compartment is the passenger compartment of an automobile.

4. A system according to claim 1, wherein the signal processing module further comprises a control module for dynamically controlling the processing of the microphone input signals and the loudspeaker output signals response to control mechanism inputs from the system users.

5. A computer-implemented method using one or more computer processes for multi-mode speech communication using a plurality of different operating modes, each operating mode associated with one of a plurality of different speech applications, the method comprising:

developing a plurality of microphone input signals received by a plurality of input microphones within a speech service compartment;

processing the microphone input signals with an input processing module to produce a set of user input signals for each speech application that are limited to currently active system users for that speech application; and processing application output communications from the speech applications with an output processing module to produce a plurality of loudspeaker output signals to a plurality of output loudspeakers within the service compartment, wherein for each different speech application, the loudspeaker output signals are directed only to output loudspeakers associated with system users currently active in that speech application;

wherein the processing of the microphone input signals and the loudspeaker output signals is dynamically controlled to respond to changes in system users currently active in each speech application, and wherein the processing modules are capable of operating in a plurality of the different operating modes at a same time, and wherein the processing of the microphone input signals comprises enhancing the user input signals for each speech application to maximize speech from system users of that speech application and to minimize audio sources other than those associated with that speech application, wherein the audio sources other than those associated with that speech application are substantially canceled such that the speech from system users of that speech application is substantially exclusively further processed by the input processing module.

6. A method according to claim 5, wherein the speech applications include a hands free telephone application and the operating modes include a mode optimized for the hands free telephone application.

7. A method according to claim 5, wherein the speech applications include an in-car communication system and the operating modes include a mode optimized for the in-car communication system.

8. A method according to claim 5, wherein the speech applications include an automatic speech recognition (ASR) application and the operating modes include a mode optimized for the ASR application.

9. A method according to claim 5, wherein a plurality of different speech applications operate in parallel.

10. A method according to claim 5, wherein the speech service compartment is the passenger compartment of an automobile.

11. A method according to claim 5, wherein dynamically controlling the processing of the microphone input signals and the loudspeaker output signals is performed in response to control mechanism inputs from the system users.

12. A method according to claim 5, wherein the output loudspeakers are located in a plurality of different locations within the service compartment and each of the system users is associated with at least one different loudspeaker.

13. A method according to claim 5, wherein the processing of the loudspeaker output signals includes determining which output speakers the loudspeaker output signals should be directed to.

14. A method according to claim 5, wherein substantially all input microphones and substantially all output loudspeakers are available to system users when the systems users are each active in a same speech application.

15. A method according to claim 5, wherein a number of microphone channels processed by the input processing module does not have to match a number of currently active speech applications or system users.

16. A method according to claim 5, wherein a number of loudspeaker output channels processed and developed by the output processing module does not have to match a number of received signals from different speech applications or for a total number of system users.

17. A method according to claim 5, wherein enhancement of the user input signals includes performing at least one of noise reduction and echo cancellation on the user input signals.

18. A method according to claim 5, wherein the output processing module enhances signals associated with the application output communications based on the speech application and adaptively mixes the enhanced signals for each currently active speech application to produce the plurality of loudspeaker output signals.

19. A method according to claim 5, wherein the enhanced user input signals are further adaptively mixed to reflect different background noises, different speech signals levels, and exploit diversity effects associated with the user input signals for each speech application.

20. A computer program product encoded in a non-transitory computer-readable medium for multi-mode speech communication using a plurality of different operating modes, each operated mode associated with one of a plurality of different speech applications, the product comprising:

program code for developing a plurality of microphone input signals received by a plurality of input microphones within a speech service compartment;

program code for processing the microphone input signals with an input processing module to produce a set of user input signals for each speech application that are limited to currently active system users for that speech application; and program code for processing application output communications from the speech applications with an output processing module to produce a plurality of loudspeaker output signals to a plurality of output loudspeakers within the service compartment, wherein for each different speech application, the loudspeaker output signals are directed only to output loudspeakers associated with system users currently active in that speech application;

wherein the processing of the microphone input signals and the loudspeaker output signals is dynamically controlled to respond to changes in system users currently active in each speech application, and wherein the processing modules are capable of operating in a plurality of the different operating modes at a same time, and wherein the processing of the microphone input signals comprises enhancing the user input signals for each speech application to maximize speech from system users of that speech application and to minimize audio sources other than those associated with that speech are substantially canceled such that the speech from system users of that speech application is substantially exclusively further processed by the input processing module.

21. A product according to claim 20, wherein a plurality of different speech applications operate in parallel.

* * * * *